United States Patent
Hall

(10) Patent No.: US 10,256,731 B2
(45) Date of Patent: Apr. 9, 2019

(54) HIGH-EFFICIENCY HOLDUP CIRCUIT FOR SWITCH-MODE POWER SUPPLY

(71) Applicant: Simmonds Precision Products, Inc., Vergennes, VT (US)

(72) Inventor: Robbie W. Hall, Charlotte, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 110 days.

(21) Appl. No.: 15/489,410

(22) Filed: Apr. 17, 2017

(65) Prior Publication Data

US 2018/0301988 A1  Oct. 18, 2018

(51) Int. Cl.
*H02M 3/335* (2006.01)
*H02M 1/00* (2006.01)

(52) U.S. Cl.
CPC ........ *H02M 3/335* (2013.01); *H02M 3/33515* (2013.01); *H02M 3/33576* (2013.01); *H02M 3/33592* (2013.01); *H02M 2001/0096* (2013.01)

(58) Field of Classification Search
CPC ....... H02M 2001/0096; H02M 3/335–3/33592
See application file for complete search history.

(56) References Cited

U.S. PATENT DOCUMENTS

| | | | |
|---|---|---|---|
| 5,781,422 A | 7/1998 | Lavin et al. | |
| 6,384,491 B1 | 5/2002 | O'Meara | |
| 6,879,140 B2 | 4/2005 | Elkin et al. | |
| 8,559,200 B2 | 10/2013 | Zong et al. | |
| 8,754,545 B2 | 6/2014 | Wai et al. | |
| 9,413,259 B1 | 8/2016 | Vinciarelli | |
| 2004/0156217 A1* | 8/2004 | Phadke | H02M 3/33569 363/21.16 |
| 2010/0309689 A1* | 12/2010 | Coulson | H02M 3/33507 363/16 |
| 2011/0255314 A1 | 10/2011 | Kuebrich et al. | |
| 2016/0141964 A1* | 5/2016 | Yu | H02M 3/33507 363/21.02 |
| 2017/0353097 A1* | 12/2017 | Lai | H02M 3/33523 |

FOREIGN PATENT DOCUMENTS

EP  2779360 A2  9/2014
EP  3079252 A2  10/2016

OTHER PUBLICATIONS

Extended European Search Report for EP Application No. 18155858. 6, dated Jul. 11, 2018, 7 pages.

* cited by examiner

*Primary Examiner* — Fred E Finch, III
*Assistant Examiner* — Rafael O. De León Domenech
(74) *Attorney, Agent, or Firm* — Kinney & Lange, P.A.

(57) ABSTRACT

Apparatus and associated methods relate to continuously providing power to a load throughout an interruption of a power source. While the power source is providing power, a converter is exciting a primary winding of a transformer. A load winding of the transformer delivers power to a load connected thereto, and a holdup winding provides power to a holdup circuit, which stores energy for use when the power source is interrupted. A turns ratio of the holdup winding to the primary winding is greater than one so that the energy stored by the holdup circuit is at a voltage that is greater than or equal to the voltage used for exciting the primary windings. If the voltage used for exciting the primary windings falls below a predetermined threshold, a one-shot controls the transfer of energy stored in the holdup circuit to a storage capacitor supplying current to the primary windings.

18 Claims, 2 Drawing Sheets

HIGH-EFFICIENCY HOLDUP CIRCUIT FOR SWITCH-MODE POWER SUPPLY

BACKGROUND

Aircraft power supplies are configured to provide power for various electrically operated systems. Some of these systems provide pilots of the aircraft information about the aircraft's performance. Some of the systems control the aircrafts flight surfaces, engines, landing gear, etc. Some of these systems provide for accommodation of passengers in the cabin of the aircraft. Each of these electrically operated systems receives operating power from some type of electrical power converter and/or supply. Some of these electrical power converters and/or supplies can fail in certain conditions. For example, when power buses switch between generators and/or a batter supply of an aircraft, electrical power that is supplied can be interrupted.

Some of electrical power converters and/or supplies are designed so as to be able to continuously deliver power, at least for a predetermined time period, to loads electrically connected thereto, even should a generator of electrical power be interrupted. Some of the methods for providing such uninterrupted power can be inefficient, expensive, bulky, and/or costly. Providing uninterrupted power for electrically operated systems of an aircraft in an efficient and compact manner would be desirable.

SUMMARY

Apparatus and associated methods relate providing uninterrupted power to a load throughout a temporary power source failure. Some embodiments relate to a power supply including a source steering diode, a transformer, a switching regulator, a holdup circuit, and a switching circuit. The source steering diode is configured to unidirectionally conduct DC electrical energy received from the source to a bulk capacitor where the conducted DC electrical energy is stored is stored at a first voltage differential across the bulk capacitor. The transformer has a source winding, a load winding, and a holdup winding. The load winding is configured to provide electrical power to a load connected thereto. The switching regulator is configured to provide, in response to a signal indicative of the electrical power provided to the load, switched current to the source winding of the transformer. The switched current is drawn from the bulk capacitor. The holdup circuit is coupled to the holdup winding of the transformer. The holdup circuit is configured to store DC electrical energy on a holdup capacitor. The DC electrical energy is stored at a second voltage differential across the holdup capacitor. The second voltage differential is greater than the first voltage differential. The switching circuit is configured to selectively transfer, in response to the first voltage differential falling below a predetermined threshold, the DC electrical energy stored on the holdup capacitor to the bulk capacitor.

Some embodiments relate to a method for continuously providing electrical power to a load throughout a source failure not exceeding a predetermined time period. The method includes unidirectionally conducting, via a source steering diode, DC electrical energy received from the source to a bulk capacitor, where the conducted DC electrical energy is stored at a first voltage differential across the bulk capacitor. A source winding, a load winding, and a holdup winding are inductively coupling via a transformer. Then power is transferred from the load winding to the load connected thereto. Switched current is drawn from the bulk capacitor and delivered to the source winding of the transformer, in response to a signal indicative of the electrical power transferred to the load. DC electrical energy is stored on a holdup capacitor via a holdup circuit coupled to the holdup winding of the transformer. The second voltage differential is greater than the first voltage differential. The DC electrical energy stored on the holdup capacitor is selectively transferred to the bulk capacitor in response to the first voltage differential falling below a predetermined threshold.

DETAILED DESCRIPTION

Apparatus and associated methods relate to continuously providing power to a load throughout an interruption of a power source. While the power source is providing power, a converter is exciting a primary winding of a transformer. A load winding of the transformer delivers power to a load connected thereto, and a holdup winding provides power to a holdup circuit, which stores energy for use when the power source is interrupted. A turns ratio of the holdup winding to the primary winding is greater than one so that the energy stored by the holdup circuit is at a voltage that is greater than or equal to the voltage used for exciting the primary windings. If the voltage used for exciting the primary windings falls below a predetermined threshold, a one-shot controls the transfer of energy stored in the holdup circuit to a storage capacitor supplying current to the primary windings.

Figure 1:
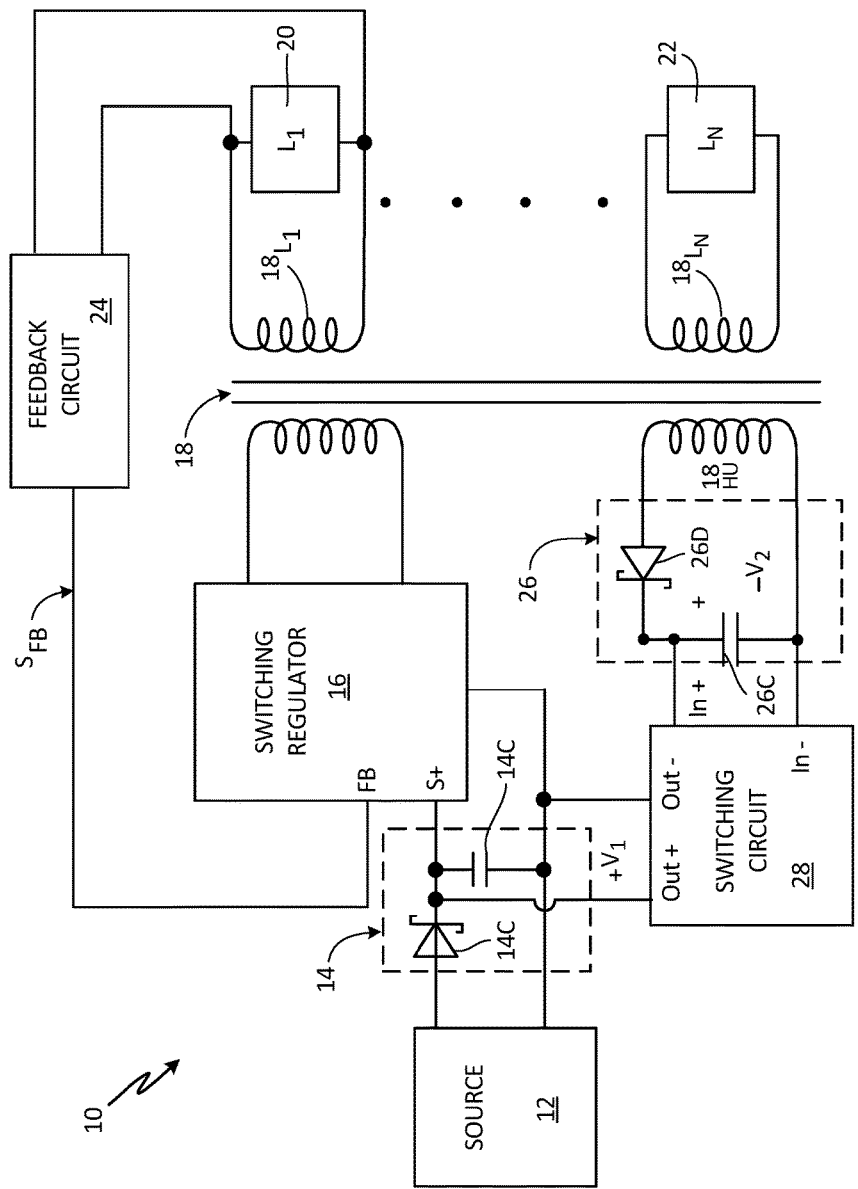
FIG. 1 is a block diagram of a switched-mode power supply with both load and holdup circuits powered by secondary windings of common transformer.

FIG. 1 is a block diagram of a switched-mode power supply with both load and holdup circuits powered by secondary windings of common transformer. In FIG. 1, switched-mode power supply 10 includes source 12, source steering diode 14, switching regulator 16, transformer 18, Loads 20 and 22, feedback circuit 24, holdup rectifier 26 and switching circuit 28. Source 12 provides DC electrical energy to source steering diode 14 of switched-mode power supply 10. In some applications, the electrical energy of the source is provided by an aircraft power source as 28 volt DC power. Source steering diode 14 includes diode 14D and bulk capacitor 14C. Source steering diode 14 steers the DC electrical energy received from source 12 to DC electrical energy stored on bulk capacitor 14C. The DC electrical energy is stored at a first voltage differential $V_1$ across bulk capacitor 14C. Source steering diode 14 prevents power flow from bulk capacitor 14C to the source should the source power be interrupted and the source voltage become lower than the voltage across bulk capacitor 14C.

Switching regulator 16 receives the DC electrical energy stored on capacitor 14C of source steering diode 14 and provides switched current to source winding 18S of the transformer. Source steering diode 14 controls the provided switched current in response to signal $S_{FB}$ indicative of the electrical power provided to the load. One or more loads $L_1 \ldots L_N$ are powered via transformer 18. In the depicted embodiment load $L_1$ is also identified as load 20, and load $L_N$ is also identified as load 22. Load 20 receives DC electrical energy from winding $18L_1$ and load 22 receives DC electrical energy from winding $18L_N$. Feedback circuit 24 generates signal $S_{FB}$ based on a sensed electrical metric indicative of electrical power delivered to load 20. In the depicted embodiment, feedback circuit 24 generates signal $S_{FB}$ based on a voltage differential across load 20.

Holdup rectifier 26 includes diode 26D and capacitor 26C. Holdup rectifier 26 converts DC electrical energy received from winding 18HU to DC electrical energy stored on capacitor 26C. The DC electrical energy is stored at a second voltage differential $V_2$ across holdup capacitor 26C. The second voltage differential $V_2$ is greater than the first voltage differential $V_1$. This relation between voltage differentials $V_1$ and $V_2$ facilitates efficient energy storage on holdup capacitor 26C. Energy stored on holdup capacitor 26C can be expressed as $E_{HU} = \frac{1}{2} CV_2^2$. Here C is the capacitance of holdup capacitor 26C, and $V_2$ is the second voltage differential at which the energy is stored on holdup capacitor 26C. Because energy storage $E_{HU}$ is proportional to the square of the second voltage differential $V_2$, energy storage $E_{HU}$ increases super-linearly with increasing second voltage differential $V_2$. Thus, holdup capacitor 26C having a relatively small capacitance value can be used to store a relatively large amount of electrical energy $E_{HU}$.

One of the challenges of such aircraft power systems arises because of the relatively low voltage (e.g., 28 V DC) of the source. Low voltage sources can make the needed energy to sustain temporary power outages difficult to achieve, as the energy stored on a capacitor is proportional to the square of the voltage across the capacitor. Providing the high voltage secondary winding addresses this problem by facilitating the creation of a relatively high voltage (e.g., with respect to the source voltage) for energy storage purposes.

Switching circuit 28 selectively transfers the electrical energy $E_{HU}$ stored on holdup capacitor 26C to bulk capacitor 14C. In some embodiments, such selective transfer of electrical energy is initiated when the first voltage differential $V_1$ falls below or is equal to a predetermined threshold voltage. For example, if source 12 fails, electrical energy stored on bulk capacitor 14C will be discharges as current is drawn from bulk capacitor 14C by switching regulator 16. As bulk capacitor discharges, the first voltage differential $V_1$ will decay toward zero volts. When the first voltage differential $V_1$ has decayed below or equal to a predetermined threshold, switching circuit 28 provides a conductive path for charge stored on holdup capacitor 26C to flow to bulk capacitor 14C. Such a charge transfer enables switching regulator 16 to continue drawing current from bulk capacitor 14C.

As discussed above, the capacitance value of holdup capacitor 26C and the second voltage differential $V_2$ at which energy is stored on holdup capacitor 26C determine the amount of electrical energy is stored on holdup capacitor 26C. The capacitance value and the second voltage differential $V_2$ are selected so as to provide power for a predetermined time period $T_{HU}$ in which source 12 is unable to provide electrical energy for switched-mode power supply 10. To provide power for the predetermined time period $T_{HU}$, the following condition must be met: $T_{HU} = E_{HU}/\Sigma P(L_n)$. Here $E_{HU}$ is the electrical energy stored on holdup capacitor 26C as disclosed above, and $P(L_n)$ is the power required to be supplied so as to provide the power delivered to load $L_n$.

As disclosed above, the stored energy $E_{HU}$ is proportional to the square of the second voltage differential $V_2$. Thus, second voltage differential $V_2$ is an effective means of achieving uninterrupted power for the time period $T_{HU}$. The second voltage differential $V_2$ is controlled by a turns ratio $N_{HU}/N_S$ of holdup winding 18HU over source winding 18S.

In some embodiments, a turns ratio $N_{HU}/N_S$ is at least 2, 3, 5 or 10, for example. Such turns ratios $N_{HU}/N_S$ provide for energy storage EHU that is 4, 9, 25 or 100 times the energy storage EHU for a turns ratio of 1, all other things being equal. Such a voltage amplification of $V_2/V_1$ is produced using turns ratio $N_{HU}/N_S$ of holdup winding 18HU of transformer 18, which also supplies power to loads $L_1 \ldots L_N$. Therefore, by adding holdup winding 18HU to transformer 18, high-voltage energy can be stored for use to supply power during source power failures.

Figure 2:
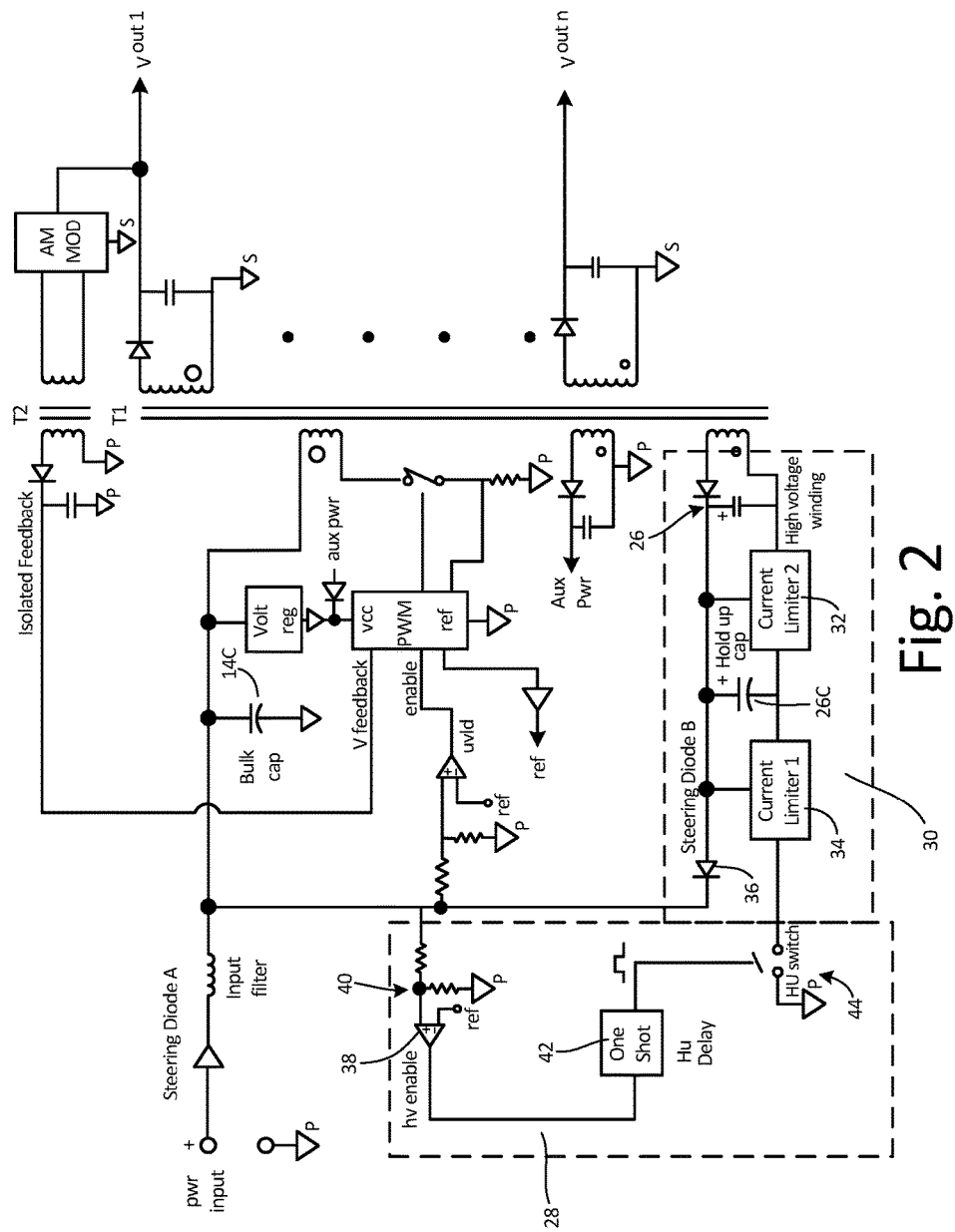
FIG. 2 is a schematic view of an exemplary switched-mode power supply with both load and holdup circuits powered by secondary windings of common transformer.

FIG. 2 is a schematic view of an exemplary switched-mode power supply with both load and holdup circuits powered by secondary windings of a common transformer. In FIG. 2, switched-mode power supply 10 described in block diagram form in FIG. 1 is given an exemplary schematic implementation. In the FIG. 2 embodiment, holdup circuit 30 includes holdup rectifier 26, current limiter 32, holdup capacitor 26C, current limiter 34 and steering diode 36. Current limiters 32 and 34 limit the current flow from holdup rectifier 26 to holdup capacitor 26C and from holdup capacitor 26C to bulk capacitor 14C, respectively.

In the depicted embodiment, switching circuit 28 includes comparator 38, voltage divider 40, one-shot 42, and holdup switch 44. Voltage divider 40 is configured to sample and scale the first voltage differential $V_1$ across bulk capacitor 14C. The sampled and scaled signal indicative of the first voltage differential $V_1$ is then electrically coupled to an input of comparator 38. Comparator 38 compares the sampled and scaled signal indicative of first differential voltage $V_1$ with a predetermined threshold $V_{REF}$. If the sampled and scaled signal indicative of first differential voltage $V_1$ falls below the predetermined threshold $V_{REF}$, then comparator 38 outputs a signal indicative of this relation. One-shot 42 receives the signal output by comparator 38, and triggers a one-shot signal for a predetermined time period. The one-shot signal controls the electrical connection of holdup switch 44. Holdup switch 44 provides conductive connection between holdup circuit 30 and bulk capacitor 14C, thereby enabling charge to transfer from holdup capacitor 26C to bulk capacitor 14C.

The following are non-exclusive descriptions of possible embodiments of the present invention.

Apparatus and associated methods relate to a power supply that includes a source steering diode configured to unidirectionally conduct DC electrical energy received from a source to a bulk capacitor where the conducted DC electrical energy is stored at a first voltage differential across the bulk capacitor. The power supply includes a transformer having a source winding, a load winding, and a holdup winding. The load winding is configured to provide electrical power to a load connected thereto. The power supply includes a switching regulator configured to provide, in response to a signal indicative of the electrical power provided to the load, switched current to the source winding of the transformer, the switched current drawn from the bulk capacitor. The power supply includes a holdup circuit coupled to the holdup winding of the transformer. The holdup circuit is configured to store DC electrical energy on a holdup capacitor. The DC electrical energy is stored at a second voltage differential across the holdup capacitor. The second voltage differential is greater than the first voltage differential. The power supply also includes a switching circuit configured to selectively transfer, in response to the first voltage differential falling below a predetermined threshold, the DC electrical energy stored on the holdup capacitor to the bulk capacitor.

The power supply of the preceding paragraph can optionally include, additionally and/or alternatively, any one or more of the following features, configurations and/or additional components:

A further embodiment of the foregoing power supply, wherein the holdup circuit can include a holdup rectifier configured to convert DC electrical energy received from the transformer via the holdup winding to the DC electrical energy stored on the holdup capacitor.

A further embodiment of any of the foregoing power supplies, wherein the holdup circuit can include a current limiter configured to limit a magnitude of current flow from the holdup winding to the holdup capacitor.

A further embodiment of any of the foregoing power supplies, wherein the switching circuit can include a one-shot configured to define a time period during which the DC electrical energy stored on the holdup capacitor is selectively transferred to the bulk capacitor.

A further embodiment of any of the foregoing power supplies, wherein the switching circuit can include a current limiter configured to limit the magnitude of current flow from the holdup capacitor to the bulk capacitor.

A further embodiment of any of the foregoing power supplies, wherein a turns ratio of the holdup winding to the source winding is greater than 3.

A further embodiment of any of the foregoing power supplies, wherein a turns ratio of the holdup winding to the source winding is greater than 2.

A further embodiment of any of the foregoing power supplies, wherein a turns ratio of the holdup winding to the source winding provides a DC electrical energy stored on the holdup capacitor that is greater than or equal to the product of the power provided to the load and the holdup time.

A further embodiment of any of the foregoing power supplies, wherein the load winding is a first load winding of a plurality of load windings.

A further embodiment of any of the foregoing power supplies can further include a feedback circuit configured to generate the signal indicative of electrical power provided to the load.

A further embodiment of any of the foregoing power supplies, wherein the transformer is a first transformer, the switching regulator is a first switching regulator, and the feedback circuit can further included a second transformer having an input winding and an output winding. The power supply can further include a second switching regulator configured to provide, in response to a signal indicative of a third voltage differential across the load, switched current drawn from the load winding and delivered to the input winding of the second transformer. The power supply can further include a feedback rectifier configured to convert DC electrical energy received from the second transformer via the feedback winding to a DC signal.

Some embodiments relate to a method for continuously providing electrical power to a load throughout a source failure not exceeding a predetermined time period. The method includes unidirectionally conducting, via a source steering diode, DC electrical energy received from the source to a bulk capacitor where the conducted DC electrical energy is stored at a first voltage differential across the bulk capacitor. The method includes inductively coupling, via a transformer, a source winding, a load winding, and a holdup winding. The method includes transferring power from the load winding to the load connected thereto. The method includes providing, via a switching regulator and in response to a signal indicative of the electrical power transferred to the load, switched current drawn from the bulk capacitor and delivered to the source winding of the transformer. The method includes storing, via a holdup circuit coupled to the holdup winding of the transformer, DC electrical energy on a holdup capacitor, the DC electrical energy stored at a second voltage differential across the holdup capacitor. The second voltage differential is greater than the first voltage differential. The method also includes selectively transferring, via a switching circuit and in response to the first voltage differential falling below a predetermined threshold, the DC electrical energy stored on the holdup capacitor to the bulk capacitor.

The method of the preceding paragraph can optionally include, additionally and/or alternatively, any one or more of the following features, configurations and/or additional components:

A further embodiment of the foregoing method, wherein storing DC electrical energy on the holdup capacitor can include converting DC electrical energy received from the transformer via the holdup winding to the DC electrical energy stored on the holdup capacitor.\

A further embodiment of any of the foregoing methods, wherein storing DC electrical energy on the holdup capacitor can include limiting, via a current limiter, a magnitude of current flow from the holdup winding to the holdup capacitor.

A further embodiment of any of the foregoing methods, wherein selectively transferring the DC electrical energy stored on the holdup capacitor to the bulk capacitor can include defining, via a one-shot, a time period during which the DC electrical energy stored on the holdup capacitor is selectively transferred to the bulk capacitor.

A further embodiment of any of the foregoing methods, wherein selectively transferring the DC electrical energy stored on the holdup capacitor to the bulk capacitor can include limiting, via a current limiter, the magnitude of current flow from the holdup capacitor to the bulk capacitor.

A further embodiment of any of the foregoing methods, wherein a turns ratio of the holdup winding to the source winding is greater than 3.

A further embodiment of any of the foregoing methods, wherein a turns ratio of the holdup winding to the source winding provides a DC electrical energy stored on the holdup capacitor that is greater than or equal to the product of the power provided to the load and the holdup time.

A further embodiment of any of the foregoing methods, wherein the load winding is a first load winding of a plurality of load windings, the method can include transferring electrical energy from each of the plurality of load windings to a corresponding load connected thereto.

A further embodiment of any of the foregoing methods can include generating, via a feedback circuit, the signal indicative of electrical power provided to the load.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A power supply comprising:
a source steering diode configured to unidirectionally conduct DC electrical energy received from a source to a bulk capacitor where the conducted DC electrical energy is stored at a first voltage differential across the bulk capacitor;
a transformer having a source winding, a load winding, and a holdup winding, the load winding configured to provide electrical power to a load connected thereto;
a switching regulator configured to provide, in response to a signal indicative of the electrical power provided to the load, switched current to the source winding of the transformer, the switched current drawn from the bulk capacitor;
a holdup circuit coupled to the holdup winding of the transformer, the holdup circuit configured to store DC electrical energy on a holdup capacitor, the DC electrical energy stored at a second voltage differential across the holdup capacitor, the second voltage differential greater than the first voltage differential;
a switching circuit configured to selectively transfer, in response to the first voltage differential falling below a predetermined threshold, the DC electrical energy stored on the holdup capacitor to the bulk capacitor; and
a one-shot configured to define a time period during which the DC electrical energy stored on the holdup capacitor is selectively transferred to the bulk capacitor.

2. The power supply of claim 1, wherein the holdup circuit comprises:
a holdup rectifier configured to convert DC electrical energy received from the transformer via the holdup winding to the DC electrical energy stored on the holdup capacitor.

3. The power supply of claim 1, wherein the holdup circuit comprises:
a current limiter configured to limit a magnitude of current flow from the holdup winding to the holdup capacitor.

4. The power supply of claim 1, wherein the switching circuit comprises:
a current limiter configured to limit the magnitude of current flow from the holdup capacitor to the bulk capacitor.

5. The power supply of claim 1, wherein a turns ratio of the holdup winding to the source winding is greater than 3.

6. The power supply of claim 1, wherein a turns ratio of the holdup winding to the source winding is greater than 2.

7. The power supply of claim 1, wherein a turns ratio of the holdup winding to the source winding provides a DC electrical energy stored on the holdup capacitor that is greater than or equal to the product of the power provided to the load and the holdup time.

8. The power supply of claim 1, wherein the load winding is a first load winding of a plurality of load windings.

9. The power supply of claim 1, further comprising a feedback circuit configured to generate the signal indicative of electrical power provided to the load.

10. The power supply of claim 9, wherein the transformer is a first transformer, the switching regulator is a first switching regulator, and the feedback circuit comprises:
a second transformer having an input winding and an output winding;
a second switching regulator configured to provide, in response to a signal indicative of a third voltage differential across the load, switched current drawn from the load winding and delivered to the input winding of the second transformer; and
a feedback rectifier configured to convert DC electrical energy received from the second transformer via the feedback winding to a DC signal.

11. A method for continuously providing electrical power to a load throughout a source failure not exceeding a predetermined time period, the method comprising:
unidirectionally conducting, via a source steering diode, DC electrical energy received from the source to a bulk capacitor where the conducted DC electrical energy is stored at a first voltage differential across the bulk capacitor;
inductively coupling, via a transformer, a source winding, a load winding, and a holdup winding;
transferring power from the load winding to the load connected thereto;
providing, via a switching regulator and in response to a signal indicative of the electrical power transferred to the load, switched current drawn from the bulk capacitor and delivered to the source winding of the transformer;
storing, via a holdup circuit coupled to the holdup winding of the transformer, DC electrical energy on a holdup capacitor, the DC electrical energy stored at a second voltage differential across the holdup capacitor, the second voltage differential greater than the first voltage differential; and
selectively transferring, via a switching circuit and in response to the first voltage differential falling below a predetermined threshold, the DC electrical energy stored on the holdup capacitor to the bulk capacitor, wherein selectively transferring the DC electrical energy stored on the holdup capacitor to the bulk capacitor comprises defining, via a one-shot, a time period during which the DC electrical energy stored on the holdup capacitor is selectively transferred to the bulk capacitor.

12. The method of claim 11, wherein storing DC electrical energy on the holdup capacitor comprises:
converting DC electrical energy received from the transformer via the holdup winding to the DC electrical energy stored on the holdup capacitor.

13. The method of claim 11, wherein storing DC electrical energy on the holdup capacitor comprises:
limiting, via a current limiter, a magnitude of current flow from the holdup winding to the holdup capacitor.

14. The method of claim 11, wherein selectively transferring the DC electrical energy stored on the holdup capacitor to the bulk capacitor comprises:
limiting, via a current limiter, the magnitude of current flow from the holdup capacitor to the bulk capacitor.

15. The method of claim 11, wherein a turns ratio of the holdup winding to the source winding is greater than 3.

16. The method of claim 11, wherein a turns ratio of the holdup winding to the source winding provides a DC electrical energy stored on the holdup capacitor that is greater than or equal to the product of the power provided to the load and the holdup time.

17. The method of claim 11, wherein the load winding is a first load winding of a plurality of load windings, the method further comprising:
transferring electrical energy from each of the plurality of load windings to a corresponding load connected thereto.

18. The method of claim 11, further comprising:
generating, via a feedback circuit, the signal indicative of electrical power provided to the load.

\* \* \* \* \*